US012095805B2

(12) United States Patent
Huang et al.

(10) Patent No.: US 12,095,805 B2
(45) Date of Patent: Sep. 17, 2024

(54) AUTONOMOUS VEHICLE SECURITY MEASURES IN RESPONSE TO AN ATTACK ON AN IN-VEHICLE COMMUNICATION NETWORK

(71) Applicant: Waymo LLC, Mountain View, CA (US)

(72) Inventors: TsengChan Stephan Huang, Milpitas, CA (US); Stacy Janes, Los Altos, CA (US); Joshua Foust, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 120 days.

(21) Appl. No.: 17/377,261

(22) Filed: Jul. 15, 2021

(65) Prior Publication Data

US 2023/0019817 A1 Jan. 19, 2023

(51) Int. Cl.
*H04L 29/06* (2006.01)
*H04L 9/40* (2022.01)
*H04L 29/08* (2006.01)
*H04L 67/12* (2022.01)

(52) U.S. Cl.
CPC ...... *H04L 63/1441* (2013.01); *H04L 63/1416* (2013.01); *H04L 67/12* (2013.01)

(58) Field of Classification Search
CPC ............. H04L 63/1441; H04L 63/1416; H04L 67/12
See application file for complete search history.

(56) References Cited

U.S. PATENT DOCUMENTS

| | | | |
|---|---|---|---|
| 9,282,110 B2 * | 3/2016 | Zhang | H04L 9/3247 |
| 11,354,406 B2 * | 6/2022 | Juliato | G06F 21/554 |
| 11,651,632 B2 | 5/2023 | Pirwani | |
| 11,652,827 B2 | 5/2023 | Overby et al. | |
| 2009/0177356 A1 * | 7/2009 | Plawecki | G05B 9/03 700/79 |
| 2014/0143839 A1 | 5/2014 | Ricci | |

(Continued)

OTHER PUBLICATIONS

Hamada Y, Inoue M, Adachi N, Ueda H, Miyashita Y, Hata Y. Intrusion detection system for in-vehicle networks. SEI Tech. Rev. (88). Apr. 2019:76-81.

(Continued)

*Primary Examiner* — Kambiz Zand
*Assistant Examiner* — Afaq Ali
(74) *Attorney, Agent, or Firm* — LOWENSTEIN SANDLER LLP

(57) ABSTRACT

An illicit signal is detected on an in-vehicle communication network of an autonomous vehicle. A severity level corresponding to the illicit signal is identified, among multiple severity levels, based on one or more characteristics associated with the illicit signal. The severity level is indicative of a level of adverse impact on safety related to an autonomous vehicle environment. The adverse impact is to be caused by the autonomous vehicle when the autonomous vehicle is compromised by the illicit signal. A security operation is selected from multiple security operations based on the identified severity level. The security operation is performed to mitigate the adverse impact on safety related to the autonomous vehicle environment.

17 Claims, 5 Drawing Sheets

(56) References Cited

U.S. PATENT DOCUMENTS

| | | | |
|---|---|---|---|
| 2016/0182559 A1* | 6/2016 | Francy | H04L 63/1441 726/1 |
| 2016/0248805 A1* | 8/2016 | Burns | H04L 63/1416 |
| 2017/0063996 A1 | 3/2017 | Kaster | |
| 2019/0191311 A1* | 6/2019 | O'Brien | G01C 21/20 |
| 2019/0327273 A1* | 10/2019 | Bryson | H04L 63/02 |
| 2019/0379682 A1* | 12/2019 | Overby | H04L 9/002 |
| 2020/0035044 A1* | 1/2020 | Levy | G07C 5/008 |
| 2020/0180653 A1 | 6/2020 | Chi et al. | |
| 2020/0216097 A1* | 7/2020 | Galula | G06F 21/51 |
| 2020/0314116 A1* | 10/2020 | Rodriguez Bravo | H04W 12/121 |
| 2021/0044612 A1* | 2/2021 | Kawauchi | B60W 50/0225 |
| 2021/0067528 A1* | 3/2021 | Tasaki | G06F 21/55 |
| 2021/0101618 A1* | 4/2021 | Levy | H04W 12/121 |
| 2021/0114606 A1 | 4/2021 | Alvarez et al. | |
| 2022/0272122 A1* | 8/2022 | Kaabouch | H04W 12/122 |
| 2022/0283796 A1 | 9/2022 | McFarland, Jr. et al. | |
| 2022/0286858 A1* | 9/2022 | Saito | H04W 12/08 |
| 2022/0289179 A1 | 9/2022 | Thomas et al. | |
| 2022/0289198 A1 | 9/2022 | Schmitt | |
| 2022/0289199 A1 | 9/2022 | Sun | |
| 2022/0297719 A1 | 9/2022 | Mittal et al. | |
| 2022/0303305 A1 | 9/2022 | Shin et al. | |
| 2022/0319310 A1 | 10/2022 | Duggal et al. | |
| 2022/0319329 A1 | 10/2022 | Kim et al. | |
| 2022/0327871 A1 | 10/2022 | Pirwani | |
| 2022/0332338 A1 | 10/2022 | Patne et al. | |
| 2022/0332350 A1 | 10/2022 | Jha et al. | |
| 2022/0334592 A1 | 10/2022 | McFarland, Jr. | |
| 2022/0334818 A1 | 10/2022 | McFarland, Jr. | |
| 2022/0338012 A1 | 10/2022 | Monteuuis et al. | |
| 2022/0345861 A1 | 10/2022 | Ling et al. | |
| 2022/0358836 A1 | 11/2022 | Baek et al. | |
| 2022/0365530 A1 | 11/2022 | Foster et al. | |
| 2022/0365540 A1 | 11/2022 | Rosales et al. | |
| 2022/0374515 A1 | 11/2022 | Bridges et al. | |
| 2022/0375284 A1 | 11/2022 | McFarland, Jr. | |
| 2022/0383750 A1 | 12/2022 | Sharma Banjade et al. | |
| 2022/0388505 A1 | 12/2022 | Sharma Banjade et al. | |
| 2022/0388530 A1 | 12/2022 | Patne et al. | |
| 2022/0392342 A1 | 12/2022 | Fields et al. | |
| 2022/0394053 A1* | 12/2022 | Sorani | H04L 63/1433 |
| 2022/0394784 A1 | 12/2022 | Hwang et al. | |
| 2022/0398149 A1 | 12/2022 | McFarland, Jr. et al. | |
| 2022/0398911 A1 | 12/2022 | Patne et al. | |
| 2022/0407872 A1 | 12/2022 | Min et al. | |
| 2022/0408245 A1 | 12/2022 | Maass et al. | |
| 2022/0408246 A1 | 12/2022 | Maass et al. | |
| 2022/0417472 A1 | 12/2022 | Mobbs | |
| 2023/0023478 A1 | 1/2023 | Hwang et al. | |
| 2023/0067689 A1 | 3/2023 | Hwang et al. | |
| 2023/0087311 A1 | 3/2023 | Soffer | |
| 2023/0095384 A1 | 3/2023 | Sharma Banjade et al. | |

OTHER PUBLICATIONS

Han K, Weimerskirch A, Shin KG. Automotive cybersecurity for in-vehicle communication. IQT Quarterly. 2014;6(1):22-5.

El-Rewini, Z., Sadatsharan, K., Selvaraj, D.F., Plathottam, S.J. and Ranganathan, P., 2020. Cybersecurity challenges in vehicular communications. Vehicular Communications, 23, p. 100214.

Dibaei M, Zheng X, Jiang K, Maric S, Abbas R, Liu S, Zhang Y, Deng Y, Wen S, Zhang J, Xiang Y. An overview of attacks and defences on intelligent connected vehicles. arXiv preprint arXiv:1907.07455. Jul. 17, 2019.

Cho, K.T., 2018. From Attack to Defense: Toward Secure In-vehicle Networks (Doctoral dissertation).

Oyler, A. and Saiedian, H., 2016. Security in automotive telematics: a survey of threats and risk mitigation strategies to counter the existing and emerging attack vectors. Security and Communication Networks, 9(17), pp. 4330-4340.

* cited by examiner

AUTONOMOUS VEHICLE SECURITY MEASURES IN RESPONSE TO AN ATTACK ON AN IN-VEHICLE COMMUNICATION NETWORK

TECHNICAL FIELD

The instant specification generally relates to vehicles. More specifically, the instant specification relates to implementing security measures in response to an attack on an in-vehicle communication network.

BACKGROUND

Vehicles, such as automotive vehicles, commonly include computers, microcontrollers, and other electronic components that sense conditions relevant to the operation of the vehicle, and that perform a variety of functions necessary for the vehicle's operation. For example, an autonomous vehicle (AV) operates by sensing an outside environment with various sensors and charting a driving path through the environment based on the sensed data, Global Positioning System (GPS) data, and road map data. Many vehicles may include dozens of electronic control units (ECUs), with each ECU controlling different aspects of one or more electrical or electromechanical subsystems of the vehicle. For example, various ECUs may be provided for engine control, powertrain control, transmission control, brake control, and speed control. Most ECUs, however, do not operate in isolation from other vehicle systems. ECUs rely on the ability to communicate with other vehicle systems, so that activities may be coordinated across the vehicle and each ECU may receive data necessary for its operations (e.g., sensor data). For this reason, many vehicles include an in-vehicle communication network, such as a controller area network (CAN) bus. ECUs are communicably coupled to the in-vehicle communication network, and messages sent between various ECUs are transmitted and received over the in-vehicle communication network. The in-vehicle communication network thus serves an important role in the operation of modern vehicles by allowing for communication between the electrical control units (and corresponding peripherals and sensors) disposed throughout the vehicle. Nonetheless, the in-vehicle communication network may also be exploited by attackers or other entities who seek to compromise the security of communications at the in-vehicle communication network.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure includes a method, comprising: detecting an illicit signal on an in-vehicle communication network of an autonomous vehicle; identifying, among a plurality of severity levels, a severity level corresponding to the illicit signal based on one or more characteristics associated with the illicit signal, the severity level indicative of a level of adverse impact on safety related to an autonomous vehicle environment, the adverse impact to be caused by the autonomous vehicle when the autonomous vehicle is compromised by the illicit signal; selecting a security operation from a plurality of security operations based on the identified severity level; and performing the security operation to mitigate the adverse impact on safety related to the autonomous vehicle environment.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

The disclosure is illustrated by way of examples, and not by way of limitation, and can be more fully understood with references to the following detailed description when considered in connection with the figures, in which.

DETAILED DESCRIPTION

Figure 1:
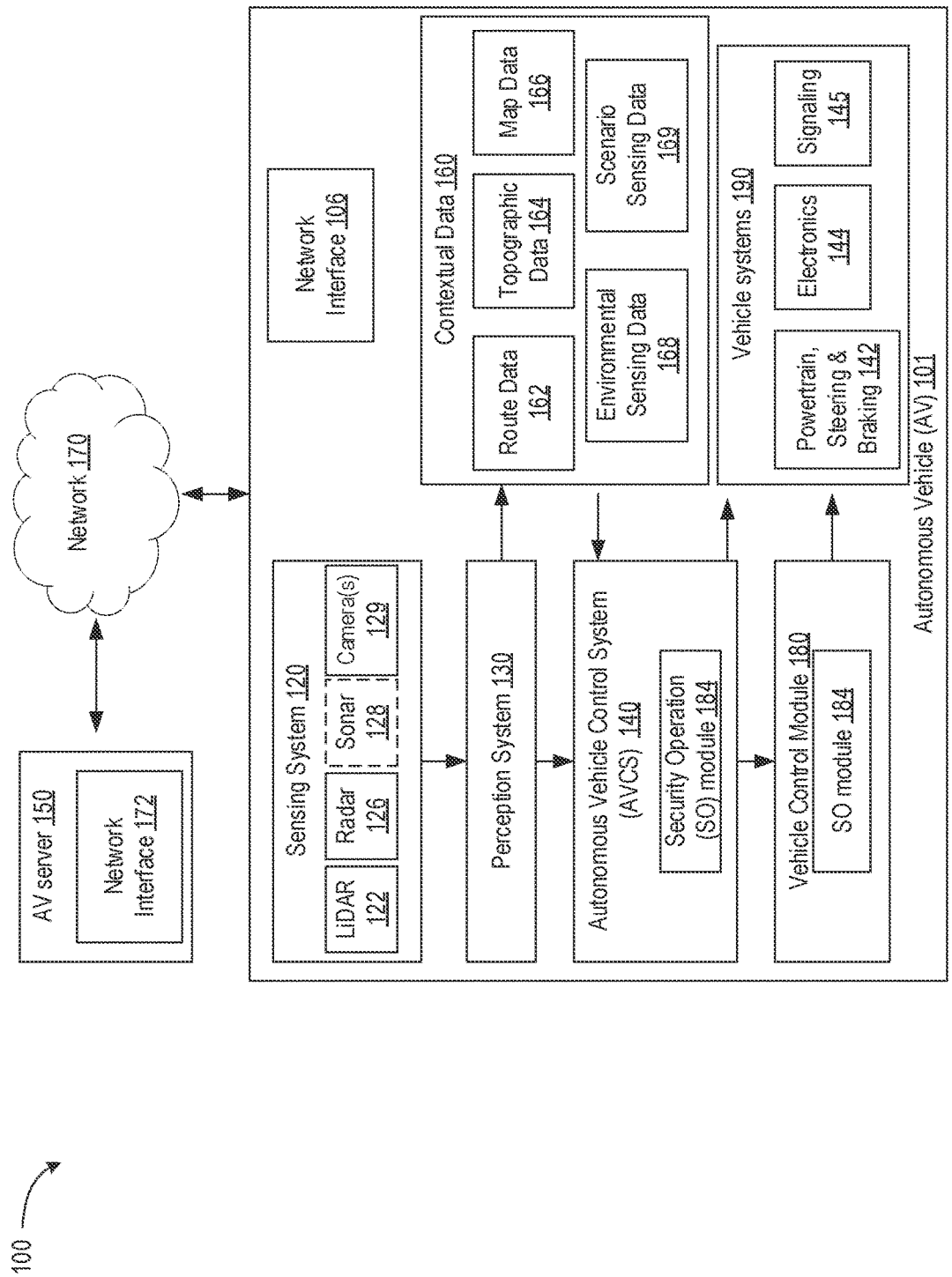
FIG. 1 is a diagram illustrating components of an example architecture of a system including an autonomous vehicle (AV) that implements security operations, in accordance with some implementations of the disclosure.

The transmission of illicit signals on an in-vehicle communication network can lead to potentially dangerous consequences for a vehicle. For example, an ECU may transmit time-sensitive messages to other ECUs on the in-vehicle communication network with instructions necessary to properly maneuver the vehicle (e.g., braking, steering, or acceleration control commands). If an attack node injects illicit signals on the in-vehicle communication network (e.g., an attack node transmits messages with altered data at a faster rate than a non-attack node), the attack node may alter the message content sufficiently to change course of the vehicle. A sophisticated attacker may even alter the content of messages to cause recipient nodes to process illegitimate data without the messages being discarded. For example, attackers may "spoof" the identity of a legitimate node by transmitting messages on the in-vehicle communication network using identifiers (e.g., source identifiers) that have been reserved for the legitimate node. In another example, an attack node may interject itself between a transmitting and receiving node(s) (man-in-the-middle attack) and alter the data that passes through the attack node.

Some systems address malicious attacks by introducing custom hardware that attempts to cancel illicit signals at the hardware level. The introduction of new hardware is not only cost-prohibitive, but also introduces potential reliability issues that can be particularly troublesome in automotive design, which emphasizes safety and reliability. Other systems address malicious attacks by introducing a hardware and software technique that uses cryptographic keys for the authentication of messages transmitted on the in-vehicle communication network. Such a system can be very cumbersome and costly to implement due, at least in part, to the time-sensitive nature of message delivery on an in-vehicle communication network and the latency caused by the authentication of messages. Further, such a system may be a partial authentication system where only some of the nodes and messages transmitted on the in-vehicle communication network are authenticated, which can make the system vulnerable to some types of malicious attacks.

Aspects of the disclosure address the above challenges along with others, by detecting an illicit signal on the in-vehicle communication network and identifying a severity level that corresponds to the illicit signal based on one or more characteristics associated with the illicit signal. The characteristics of the illicit signal can include one or more message identifiers of the illicit signal (e.g., source identifier (ID), destination ID, content ID, etc.) or include or identify a part of the in-vehicle communication network impacted by the illicit signal. The severity level can be indicative of a level of adverse impact on safety related to an autonomous vehicle environment where the adverse impact is to be caused by the autonomous vehicle when the autonomous vehicle is compromised by the illicit signal.

For example, in a first instance an illicit signal may compromise the passenger seat such that the passenger seat electronics no longer allow the passenger seat to change position. In another instance, an illicit signal may compromise the braking system such that the brakes no longer slow or stop the autonomous vehicle. In the first instance, the severity level is relatively low since the potential adverse impact to people, the vehicle, or surrounding property is low when the passenger seat electronics are non-functional. In the second instance, the severity level is relatively high since the potential adverse impact to people (e.g., injury to passengers, to people in proximate vehicles, and/or to pedestrians), the vehicle (e.g., damage to the vehicle), and/or surrounding property (e.g., damage to proximate vehicles, structures, etc.) is high when the braking system is non-functional.

In some implementations, the severity levels correspond to one or more security operations. A security operation can refer to an operation performed in response to a detected illicit signal where the security operation is performed to help mitigate the adverse impact on safety related to the autonomous vehicle environment.

In some implementations, a severity level can correspond to a particular group of security operations. Different severity levels can correspond to different groups of security operations. Once a severity level is determined and a corresponding group of vehicle operations is identified, a particular security operation(s) can be selected from the corresponding group of security based on a vehicle state, such as an operational state (e.g., driving state or parked state) or some other vehicle state.

In an illustrative example, an illicit signal is detected that impacts the steering system. The impact of a compromised steering system on the people, vehicle, and surrounding property is high. Thus, a high severity level is attributed to the illicit signal that impacts the steering system. The high severity level can be associated with a group of security operations, the most intrusive being an application of the brakes and the least intrusive prohibiting the autonomous vehicle from starting. To determine which of the group of security operations to perform, the autonomous vehicle can evaluate the current vehicle state to be in a parked state, and as such determine that the appropriate security operation is to prohibit the autonomous vehicle from starting.

In some implementations, the in-vehicle communication network can be monitored for illicit signals. For example, a receiver node of the in-vehicle communication network can receive a message transmitted on an in-vehicle communication network and determine a source identifier in the message. The source identifier can identify the source node that transmitted the message. In some cases, a source identifier can be unique to each node. If the receiver node identifies its own source identifier in a message and determines that it did not transmit the message, the receiver node can further determine that the message is an illicit signal.

In some implementations, a node of the in-vehicle communication network, such as the AV control system, can monitor a vehicle action (e.g., steering, braking, etc.) that is performed by the vehicle based on control commands (e.g., instructions) issued by the AV control system. If the performance of the vehicle action exceeds a threshold tolerance (e.g., the vehicle is accelerating past the instructed speed above a threshold amount), the AV control system can infer that an illicit signal is being transmitted on the in-vehicle communication network.

Therefore, advantages of the systems and methods implemented in accordance with some aspects of the disclosure include, but are not limited to, improving the operation and safety of a vehicle, and in particular an AV by evaluating multiple factors to determine, from multiple security operations, the optimal security operation to be performed for a current vehicle state in response to an illicit signal that compromises the safety of the AV.

An illicit signal can refer to an electric signal, such as a message, that has been created or modified by an unauthorized third party (e.g., with a presumably malicious purpose).

An in-vehicle communication network (also referred to as an "in-vehicle network" herein) can refer to a data communication system, such as an automotive data communication system that is used to electrically connect nodes, such as electronic control units or other electronic devices. The connected nodes can be part of the in-vehicle communication network. In some implementations, the in-vehicle communication network can include a linear bus or a complex network implementing one or more gateways (e.g., gateway devices).

An electronic control unit (ECU) can refer to a system, such as an embedded system, that controls one or more electrical systems, subsystems, or peripheral devices (e.g., sensors or actuators) in a vehicle.

It can be noted that references to autonomous vehicles in the disclosure are provided for purposes of illustration, rather than limitation. Aspects of the disclosure can be applied to autonomous vehicles (e.g., partially or fully autonomous) as well as non-autonomous vehicles. It can also be noted that reference to automotive vehicles is used for the purpose of illustration, rather than limitation. Aspects of the disclosure can be applied to any type of vehicle, including but not limited to automobiles, heavy machinery (e.g. agricultural tractors, graders, excavators, loaders, material handlers, mining equipment, etc.), planes, trains, or other vehicles.

FIG. 1 is a diagram illustrating components of an example architecture 100 of a system including an autonomous vehicle (AV) 101 that implements security operations, in accordance with some implementations of the disclosure. Autonomous vehicles can include any motor vehicles, such as cars, trucks, tractors (with or without trailers), buses, motorcycles, all-terrain vehicles, recreational vehicles, any specialized farming or construction vehicles, and the like), or any other self-propelled vehicles capable of being operated in a self-driving mode (without a human input or with a reduced human input). Autonomous vehicles can include vehicles with various levels of autonomy, such as level 2 (partial autonomy) through level 5 (full autonomy). Autonomous vehicles can include vehicles using an internal combustion engine (e.g., gas engine, diesel engine, etc.), an electric engine (motor), or combination thereof (e.g., hybrid AV). AV 101 can be capable of traveling on paved and/or unpaved roadways, off-road, on various surfaces encountered on farming (or other agricultural) land, within a driving environment (including indoor environment) of an industrial plant, and so on.

AV 101 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on. For example, optical sensing can utilize a range of light visible to a human eye (e.g., the 380 to 400 nm wavelength range), the UV range (below 380 nm), the infrared range (above 400 nm), the radio frequency range (above 1 m), etc. In implementations, "optical" can include any other suitable range of the electromagnetic spectrum.

The sensing system 120 can include one or more radar units 126, which can be any system that utilizes radio or microwave frequency signals to sense objects within the driving environment of the AV 101. The radar unit(s) can be configured to sense both the spatial locations of the objects (including their spatial dimensions) and their velocities (e.g., using the Doppler shift technology), such as translational velocities and angular (rotational) velocities. The sensing system 120 can include one or more LiDAR sensors 122 (e.g., a LiDAR rangefinders), which can be laser-based units capable of determining distances (e.g., using ToF technology) to the objects in the environment around AV 101. For example, LiDAR(s) 122 can emit one or more laser signals (pulses) that travel to an object and then detect arrived signals reflected from the object. By determining a time delay between the signal emission and the arrival of the retro-reflected waves, a ToF LiDAR can determine the distance to the object. LiDAR(s) 122 can emit signals in various directions to obtain a wide view of the outside environment. LiDAR(s) 122 can utilize wavelengths of electromagnetic waves that are shorter than the wavelength of the radio waves and can, therefore, provide a higher spatial resolution and sensitivity compared with the radar unit 126. In some implementations, LiDAR(s) 122 can be (or include) coherent LiDAR(s), such as a frequency-modulated continuous-wave (FMCW) LiDAR(s). FMCW LiDAR(s) (or some other coherent LiDAR sensors) can use optical heterodyne detection for instant velocity determination. LiDAR(s) 122 can include one or more laser sources producing and emitting signals and one or more detectors of the signals reflected back from the objects, one or more spectral filters to filter out spurious electromagnetic waves having wavelengths (frequencies) that are different from the wavelengths (frequencies) of the emitted signals, one or more directional filters (e.g., apertures, diffraction gratings, and so on) to filter out electromagnetic waves that arrive at the detectors along directions different from the directions of the emitted signals, and other components that can enhance sensing capabilities of the LiDAR(s) 122. In some implementations, LiDAR(s) 122 can ensure a 360-degree view in a horizontal direction and up to 90 degrees in the vertical direction.

Sensing system 120 can further include one or more cameras 129 to capture images of the driving environment. The images can be two-dimensional projections of the driving environment (or parts of the driving environment) onto a projecting plane (flat or non-flat, e.g. fisheye) of the cameras. Some of cameras 129 of sensing system 120 can be video cameras configured to capture a continuous (or quasi-continuous) stream of images of the driving environment. Sensing system 120 can also include one or more sonars 128, which can be ultrasonic sonars, in some implementations.

The sensing data obtained by sensing system 120 can be processed by a perception system 130 that can be configured to detect and track objects in the driving environment and to identify the detected objects. For example, perception system 130 can analyze images captured by cameras 129 and can be capable of detecting traffic light signals, road signs, roadway layouts (e.g., boundaries of traffic lanes, topologies of intersections, designations of parking places, and so on), presence of obstacles, and the like. Perception system 130 can further receive LiDAR sensing data (coherent Doppler data and incoherent ToF data) to determine distances to various objects in the environment and velocities of such objects. In some implementations, perception system 130 can use the LiDAR data in combination with the data captured by the camera(s) 129. In one example, the camera(s) 129 can detect an image of a rock partially obstructing a traffic lane. Using the data from the camera(s) 129, the perception system 130 can be capable of determining the angular size of the rock, but not the linear size of the rock. Using the LiDAR data, perception system 130 can determine the distance from the rock to the AV and, therefore, by combining the distance information with the angular size of the rock, perception system 130 can determine the linear dimensions of the rock as well.

In another implementation, using the LiDAR data, perception system 130 can determine how far a detected object is from the AV and can further determine the component of the object's velocity along the direction of the AV's motion. Furthermore, using a series of quick images obtained by the camera, perception system 130 can also determine the lateral velocity of the detected object in a direction perpendicular to the direction of the AV's motion. In some implementations, the lateral velocity can be determined from the LiDAR data alone, for example, by recognizing an edge of the object (using horizontal scanning) and further determining how quickly the edge of the object is moving in the lateral direction.

Perception system 130 can further receive information from a positioning subsystem that may include a GPS transceiver (not shown) configured to obtain information about the position of the AV relative to Earth and its surroundings. The positioning subsystem can use the positioning data (e.g., GPS data and/or inertial measurement data) in conjunction with the sensing data to help accurately determine location of the AV with respect to fixed objects of the driving environment, such as roadways, lane boundaries, intersections, sidewalks, crosswalks, road signs, surrounding buildings, and so on, locations of which can be provided by map information accessible by perception system 130. In some implementations, perception system 130 can receive non-electromagnetic data, such as sonar data (e.g., ultrasonic sensor data), temperature sensor data, pressure sensor data, meteorological data (e.g., wind speed and direction, precipitation data), or other environmental monitoring data.

In some implementations, the perception system 130 can provide, generate or be used to help generate at least some contextual data 160. Contextual data 160 can include one or more of route data 162, topographic data 164, map data 166, environmental sensing data 168, scenario sensing data 169, or GPS data (not shown). Herein "route" shall refer to a sequence of physical locations (e.g., geographic markers) that can be traveled by a target vehicle between a starting point ("start") and a destination point ("destination"). The start and/or the destination need not be the initial and final locations of the vehicle in the driving mission, but can be any two points (e.g., A and B) along such a mission. Accordingly, "mission" herein shall refer to any portion of the overall driving task. Route data 162 can include information about the starting point, intermediate points and destination point of the route (e.g., longitude and latitude information of points along the route) and include physical characteristics of various routes. "Trajectory" shall refer to driving settings, specified for various locations along the route, and shall include speed/throttle/brake/etc. controls that determine progression of the vehicle along the route. For example, a trajectory can include throttle settings, T(L) as a function of the location L along the route, target speed of the vehicle S(L), gear selection sequences, and so on. The location L can be identified by the distance travelled, GPS coordinates, road markers (e.g., mileposts), or a combination thereof, or in any other way. Topographic data 164 can include information about the topography of the roads (e.g., grade and radius of curvature) or topography along the route. Map data 166 can include information about the road network along the route, such as the quality of road surfaces, number of lanes, speed limits, type and number of exit ramps, availability of gas stations, and so on. Map data 166 can also include traffic data that includes information about historic traffic patterns or current traffic conditions along or near the route. Environmental sensing data 168 can be the data obtained by sensing system 120 and/or include data from the perception system 130 that has been generated using the data from the sensing system 120. For example, environmental sensing data 168 can include information describing the environment near or around the AV 101 (e.g., position of other vehicles, obstacles, or other elements with respect to the AV 101). Scenario sensing data 169 can include predicative data generated by using other contextual data, such as environmental sensing data 168 to make predictions about future scenarios. For example, the environmental sensing data 168 can indicate that another vehicle is in an adjacent lane and has an engaged turn signal. The corresponding scenario sensing data 169 can include information indicating a prediction that the vehicle will enter the same lane that AV 101 currently occupies in 3 seconds and will be approximately 3 meters in front of AV 101 at that time.

The data generated by perception system 130 as well as various additional data (e.g., contextual data 160, GPS data processing module, and the like) can be used by an autonomous driving system, such as AV 101 control system (AVCS) 140. The AVCS 140 can include one or more algorithms that control how AV 101 is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as vehicle systems 190 (e.g., the powertrain, steering and braking 142, vehicle electronics 144, and signaling 145), vehicle control module (VCM) 180, and other systems and components not explicitly shown in FIG. 1. The powertrain, steering and braking 142 can include an engine (internal combustion engine, electric engine (motor), and so on), transmission, differentials, axles, wheels, steering mechanism, braking mechanism, and other systems. The vehicle electronics 144 can include an on-board computer, engine management, ignition, communication systems, carputers, telematics, in-car entertainment systems, and other systems and components. The signaling 146 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, steering and braking 142 (or signaling 146), whereas other instructions output by the AVCS 140 are first delivered to the VCM 180, which can generate commands to the powertrain, steering and braking 142 and/or signaling 145.

In one example, the AVCS 140 can determine that an obstacle identified by perception system 130 is to be avoided by decelerating the vehicle until a safe speed is reached, followed by steering the vehicle around the obstacle. The AVCS 140 can output instructions to the powertrain, steering and braking 142 (directly or via the VCM 180) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions (e.g., control commands) to the powertrain, steering and braking 142 (directly or via the VCM 180) to resume the previous speed settings of the vehicle.

In some implementations, AVCS 140 can include a security operation module 184 (e.g., SO module 184) that can interface with VCM 180, and in particular with another instance of security operation module 184 of the VCM 180.

In some implementations, VCM 180 can control vehicle systems 190 at the behest of the AVCS 140. AVCS 140 can send a control command, rather than directly to the vehicle systems 190, to VCM 180. VCM 180 can execute the control command by actuating one or more of the vehicle systems 190.

In some implementations, AV 101 can be implemented without VCM 180. In other implementations, a vehicle, such as a non-autonomous vehicle can be implemented with VCM 180 and without AVCS 140. In such implementations, a human being as a driver can perform at least some of the operations corresponding to the operations performed by one or more of perception system 130 or sensing system 120.

In some implementations, one or more of security operation module 184 of AVCS 140 or security operation module 184 of VCM 180 can perform one or more operations as described herein. For example, in some implementations, security operation module 184 of AVCS 140, security operation module 184 of VCM 180, or a combination thereof can monitor an in-vehicle communication network and detect an illicit signal on the in-vehicle communication network. Security operation module 184 of AVCS 140, security operation module 184 of VCM 180, or a combination thereof can identify, among multiple severity levels, a severity level corresponding to the illicit signal based on one or more characteristics associated with the illicit signal, select a security operation from multiple security operations based on the identified severity level, and perform the security operation to mitigate the adverse impact on safety related to the autonomous vehicle environment. The operations of the security operation module 184 are further described below.

In some implementations, VCM 180 can be a third-party VCM. A third party can refer to an entity, such as an enterprise or business (e.g., designer or manufacturer of the base vehicle) that is distinct from another entity, such as the entity converting the base vehicle into an AV. As noted above, in some implementations an entity can design or manufacture the base vehicle, including the VCM 180, and another entity can convert the base vehicle into an AV. In some implementations, the third-party VCM 180 is designed, produced, or controlled by an entity that is different from the entity that designed, produced, or has control over the AVCS 140. In some implementations, VCM 180 is not a third-party VCM. For instance, the VCM 180 can be a first-party element designed by the entity that converts the base vehicle to an AV. In cases where the AV is designed from the "ground up" as an autonomous vehicle, the VCM 180 and AVCS 140 can be designed by the same entity. In some implementations, the VCM 180 is integrated with the AVCS 140. For example, the VCM 180 can be designed as a "plug-in" or other software component that adds one or more features to the AVCS 140. For instance, the VCM 180 can be updated/upgraded (e.g., periodically or upon each startup of the AV 101) with new or improved features for the security operation module 184 without updating/upgrading the entirety of the AVCS 140.

In some implementations, AVCS 140 can be the primary authority and/or component involved in planning and decision making on positioning and operation of the AV 101. The AVCS 140 can receive various contextual data, as illustrated by contextual data 160, and make decisions about the positioning of the AV 101 with respect to the external environment based on the contextual data 160. In some implementations, the AVCS 140 controls the position of the AV 101 based on a very strict tolerance (e.g., within a few centimeters from the requested position). For example, the AVCS 140 can evaluate the contextual data 160 and determine a position with respect to the external environment to move the AV 101. To control the positioning of the AV 101, AVCS 140 can send one or more control commands to the VCM 180 for execution by the VCM 180. In some implementations, to control the positioning of the AV 101, the AVCS 140 can send one or more control commands to one or more of the vehicle systems 190. In some implementations, the control commands can direct the VCM or one or more of the vehicle systems 190 to perform vehicle actions, such as braking, steering, and throttling, such that the corresponding components of the brake system, steering system, and powertrain, respectively are actuated in the performance of the vehicle actions. In some implementations, the VCM 180 of one or more of the vehicle systems 190 are expected to execute the control commands within the constraints (e.g. tolerance) imposed by the control commands such that the position of the AV as determined by the AVCS 140 can be controlled with precision.

For example, the AVCS 140 can send one or more control commands to the VCM 180. The VCM 180 can receive the one or more control commands from AVCS 140. In some implementations, the control commands can identify a vehicle action and/or constraints associated with the vehicle action. The vehicle action can refer, for example, to the movement or positioning of the AV and can be taken, for example, by one or more of the powertrain, steering, or braking systems. The constraints can refer, for example, to the parameters related to the vehicle action and/or the tolerance allowed by the AVCS 140 in executing the vehicle action at the given parameter value. For example, AVCS 140 can send a control command to apply brake pressure (e.g., vehicle action) of some amount (e.g., X pounds per square inch (PSI)) with a given tolerance (e.g. 0.1 percent (%)) (where the amount of brake pressure and tolerance are a constraint). VCM 180 can actuate the brakes of the AV to apply the amount of pressure within the prescribed constraints as identified by the control command. In another example, a control command indicates X amount of throttle that should be applied at time 0 with a tolerance of 0.1 percent, Y amount of throttle that should be applied at time 1 with a tolerance of 0.5 percent, and Z amount of throttle that should be applied at time 2 with a tolerance of 0.2 percent to maintain a speed of approximately 60 km/h during time 0 through time 2.

In some implementations, architecture 100 can also include AV server 150 to communicate relevant information to and receive relevant information from AV 101. For example, relevant information can include traffic information, weather information, route information, among other information. In some implementations, AV server 150 can be, at least at times, communicating with AV 101 via network 170. In some implementations, AV 101 can be connected to network 170 at most or all times. In some implementations, AV 101 can establish connections to network 170 intermittently, when an appropriate network signal is available. In some implementations, AV 101 can be connected to network 170 prior to starting the driving mission. Network 170 can use a wireless connection, such as a broadband cellular connection (e.g., 3G, 4G, 4G LTE, 5G, connection(s), and so on), a wireless local area network (WLAN), a wireless wide area network (WWAN), a wired connection, a satellite connection, or the like. Connection to network 170 can be facilitated via a network interface 106 (on the side of AV 101) and a network interface 172 (on the side of AV server 150). Network interfaces 106 and 172 can include antennas, network controllers, radio circuits, amplifiers, analog-to-digital and digital-to-analog converters, physical layers (PHY), media access control layers (MAC), and the like.

In some implementations, AV 101 can be implemented with one or more fully redundant or partially redundant systems or subsystems (not shown). A redundant system or subsystem can help AV 101 maintain operation in the case that a failure, such as a critical failure, occurs in a system or subsystem having a redundant counterpart. A redundant system or subsystem can perform the same or similar operations to a respective redundant counterpart system or sub-system. For example, the failure of the AVCS 140 may be a catastrophic failure without the implementation of a redundant AVCS. If AVCS 140 fails, AV 101 may engage the redundant AVCS and operate the vehicle using the redundant AVCS with little to no impact on the operation of the AV 101. In some implementations, at least part of one or more of the sensing system 120, perception system 130, AVCS 140, VCM 180, or vehicle systems 190 can have, at least in part, redundant counterparts (e.g., redundant system or subsystem). For the sake of brevity, a partially or fully redundant system or subsystem will be referred to as a redundant system in the following disclosure. It should be understood that a redundant system can refer to a partially redundant system, a fully redundant system, a partially redundant sub-system, or fully redundant sub-system, herein, unless otherwise described. An example of a redundant AV system is further described below with respect to FIG. 2.

Figure 2:
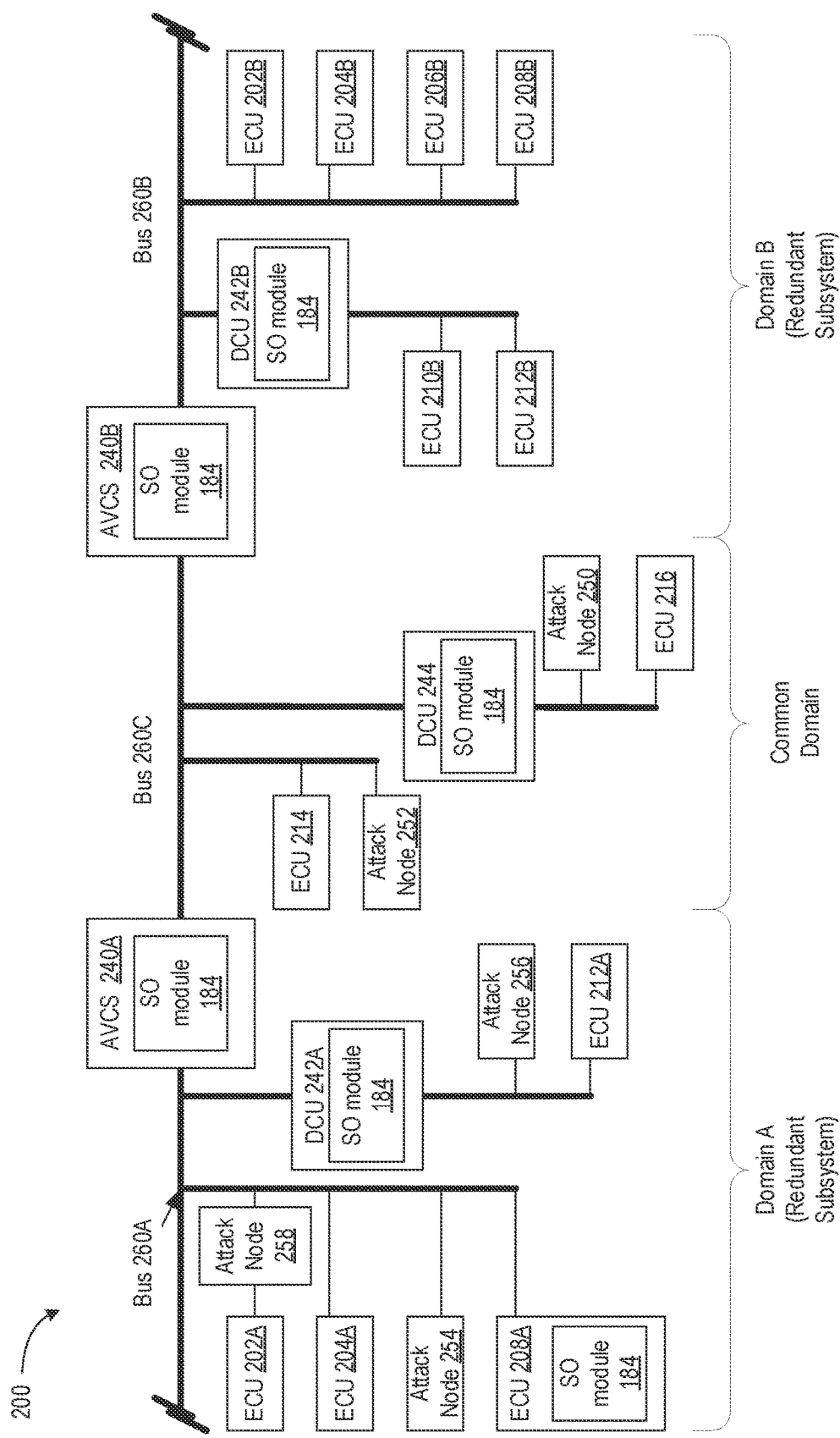
FIG. 2 is a diagram illustrating an in-vehicle communication network, in accordance with some implementations of the disclosure.

FIG. 2 is a diagram illustrating an in-vehicle communication network, in accordance with some implementations of the disclosure. Components of FIG. 1 are used to help describe aspects of FIG. 2.

In-vehicle communication network 200 includes various nodes such as one or more of one or more ECUs, one or more domain control units (DCUs), one or more attack nodes, or one or more autonomous vehicle control systems (AVCS).

In some implementations, an in-vehicle communication network can include one or more redundant systems. In-vehicle communication network 200 is shown with one or more redundant systems, illustrated by Domain A (e.g., redundant system(s) A) and Domain B (e.g., redundant system(s) B). For example, Domain A and Domain B can include redundant systems that are safety-critical systems. If one or more components of a system or an entire system fails in Domain A, the same or similar component(s) or system can be engaged or enabled in Domain B so that continuity of vehicle operation is achieved. In some implementations, the common domain represents systems or components that do not have redundant counterparts. For example, the systems in the common domain can be non-safety-critical systems (e.g., passenger seat heater). In some implementations, the systems and components of the common domain can be shared between Domain A and Domain B.

In an illustrative example, in-vehicle communication network 200 can have redundant AVCSs, such as AVCS 240A and AVCS 240B that perform or are capable of performing the same or similar operations. Domain A can include one or more of a steering system, braking system, AVCS, power system, or sensor system (e.g. LiDAR, etc.). Domain B can include one or more redundant systems including one or more of a redundant steering system, redundant braking system, redundant AVCS, redundant power system, or redundant sensor system (e.g. LiDAR, etc.).

It can be noted that the redundant system(s) of in-vehicle communication network 200 are provided for illustration rather than limitation. In other implementations, no redundant or different redundant systems can be implemented on in-vehicle communication network 200.

The various nodes are communicatively coupled (e.g., by physical wire or cable) to one another by bus 260A, bus 260B, and bus 260C (generally referred to as "bus 260" herein). A bus, such as a vehicle bus, can refer to a specialized internal communications network that interconnects components (e.g., nodes) inside a vehicle. In some implementations, specialized vehicle protocols can be used on the bus 260 to implement vehicle control standards such as assurance of message delivery, of non-conflicting messages, of minimum time of delivery, of low cost, and of EMF noise resilience, as well as redundant routing and other characteristics that mandate the use of less common networking protocols.

In some implementations, bus 260 can include, at least in part, a controller area network (CAN) bus that comports with one or more of the ISO 11898 series of standards, such as ISO 11898-1 (data link layer), ISO 11898-2 (physical layer for high-speed CAN), ISO 11898-3 (physical layer for low-speed CAN), and CAN Flexible Data-Rate (e.g., CAN FD 1.0) specification. In some implementations, bus 260 may additionally or alternatively be based on other standards or specifications related to controller area networks. In some implementations, bus 260 is another type of multi-node bus other than CAN. For example, bus 260 may be a multi-master serial bus that allows wired nodes in a smart home to assert dominant and recessive signals to pull the bus 260 into one of two states in a similar manner to CAN. The nodes may contend for access to the bus 260 via an arbitration procedure that relies on dominant and recessive bit assertions, and a winning node may be granted a period of exclusivity to transmit its message without interference by other compliant nodes.

In some implementations, one or more systems or components of an in-vehicle communication network 200 can include a gateway device. For example, in some implementations one or more of AVCS 240A, AVCS 240B, DCU 242A, DCU 244, DCU 242B can operate as a gateway device. A gateway device can refer to a hardware device that acts as a "gate" between at least two communication networks or at least two parts of the same communication network. In some implementations, the gateway device can enable signals to be transmitted in and out of a particular network or part of a network. In some implementations, the gateway device can protect or isolate nodes within a communication network or within part of a communication network. In some implementations, the gateway device can be a node in the network.

It should be understood that illustrations of systems of in-vehicle communication network 200 as gateway devices are provided for illustration rather than for limitation. For example, in some implementations, AVCS 240A and AVCS 240B can both access components and systems of one or more of Domain A, Domain B, or Domain C with or without one or more of AVCS 240A or AVCS 240B configured or operating as a gateway device.

In some implementations, one or more nodes of in-vehicle communication network 200 are ECUs, such as ECU 202A, ECU 204A, ECU 208A, ECU 212A, ECU 214, ECU 216, ECU 202A, ECU 204B, ECU 206B, ECU 208B, ECU 210B and ECU 212B. In some implementations, any number of ECUs can be implemented on an in-vehicle communication network 200. The ECUs of the in-vehicle communication network 200 can communicate with each other and other nodes on the in-vehicle communication network 200 via bus 260. In some implementations, each ECU is independently controlled and maintains its own clock. In some implementations, although the ECUs of in-vehicle communication network 200 typically align their local clocks to the extent necessary to ensure that digital messages can be sent and received over the bus 260 so that transmitted bit values align with expected or slotted time intervals for those bits, the ECUs may not need to be synchronized via a centralized clock signal.

An ECU of in-vehicle communication network 200 can include one or more of one or more main processing devices, one or more peripherals, and a transceiver. In some implementations, the main processing device can be a microcontroller, for example, that coordinates activities among various components of ECU, samples values from sensors at the ECU, generates control signals to actuate one or more pneumatic or electromechanical devices of ECU, and/or implements a controller, such as CAN controller. A main processing device may include software, hardware, firmware, or a combination thereof. In some implementations, the controller of the main processing device manages the ECU's communications over bus 260. The controller generates messages for transmission over bus 260 and processes messages received over bus 260.

In some implementations, the transceiver interfaces the main processing device (and controller) with bus 260. For example, the controller may forward messages for transmission over bus 260 to the transceiver via a TX line that connects the main processing device to the transceiver. In some implementations, messages can be communicated to the transceiver from the controller serially as a sequence of binary bit values. The transceiver converts the binary values of messages from controller to corresponding signal levels driven over bus 260 (e.g., a dominant signal with CAN-HI>CAN-LO for logical '0' or a recessive signal with CAN-HI<=CAN-LO for logical '1'). Likewise, the transceiver can detect signals sent from other nodes on bus 260 by reading the voltage or potential differences between lines of bus 260, and their changes over time. In this manner, the transceiver can receive messages that other nodes have transmitted over bus 260. Transceiver forwards messages received over bus 260 to the controller via an RX line running between the main processing device and the transceiver. The controller then processes the received message. The transceiver may be implemented as software, firmware, hardware, or a combination thereof. In some implementations, the transceiver is or includes a field-programmable gate array (FPGA) or application-specific integrated circuit (ASIC).

In some implementations, some or all ECUs and other nodes coupled to the bus 260 listen for and receive all messages transmitted over some or part of bus 260. In some implementations, a message sent from one node (e.g., from an ECU) may be broadcast on bus 260. Transmitted messages are typically not intended for all nodes. The controller of the main processing device may evaluate an identifier (e.g., receiver identifier) of the received message to determine whether the received message is relevant to the local ECU. If the message is relevant to the ECU, then the main processing device may process and act on the message accordingly. If the message is not relevant to the ECU, then the main processing device may discard the message.

In some implementations, the peripherals of an ECU can include sensors, actuators, and the like that enable the ECU to carry out its primary function(s). For example, ECU 202A may be an engine control module, transmission control module, brake control module, steering control module, body control module, or suspension control module that includes (or interfaces with) corresponding sensors and actuators related to the ECU's primary function(s). The primary function(s) of the ECU can relate to the control and/or monitoring of vehicle subsystems that further the operation of the vehicle.

In some implementations, the in-vehicle communication network 200 includes one or more domain control units, such as DCU 242A, DCU 244, and DCU 242B. A DCU can include similar components and perform similar operation as described with respect to ECUs herein, unless otherwise described. DCUs typically manage a particular part (e.g., domain or subdomain) of an in-vehicle communication network 200. In some implementations, a DCU can control, interface or manage one or more ECUs that are part of the DCUs domain or sub-domain. For example, DCU 242B can control, interface or manage with ECU 210B and ECU 212B where the ECU 210B and ECU 212B are the part of the sub-domain managed by DCU 242B. In some implementations, a DCU can function as a gateway device as described above.

In some implementations, in-vehicle communication network 200 may be susceptible to attack from one or more attack nodes, such as attack node 254, attack node 256, attack node 252, attack node 258, or attack node 250. In some implementations, an attack node can be any node or component in the in-vehicle communication network 200. For example, an attack node may be an ECU, DCU, AVCS (e.g., the software and/or hardware thereupon) or other type of node that injects illicit signals onto in-vehicle communication network 200. In some implementations, the attack node can be an additional node inserted into the in-vehicle communication network 200, illustrated by attack node 258. Attack node 258 illustrates a man-in-the-middle attack scenario where attack node 258 intercepts, relays and possibly alters the messages (e.g., communications) between two other nodes that believe that they are directly communicating with each other. In some implementations and as illustrated, attack node 258 operating as a man-in-the-middle attack node can be physically inserted between two nodes (e.g., between ECU 202A and AVCS 240A) and/or act as a gateway device. As noted above, illicit signals can include unauthorized or improper signals that interfere with the transmission of legitimate signals, or that fool other nodes into believing that the illicit signal is a legitimate signal that should be acted on accordingly.

In some implementations, one or more nodes of in-vehicle communication network 200 can implement a security operation module 184. For example, each of ECU 208A, DCU 242A, AVCS 240A, DCU 244, AVCS 240B, and DCU 242B implement an instance of security operation module 184. In other implementations, any node of in-vehicle communication network 200 can implement a security operation module 184. The security operation module 184 can perform activities related to security operations as further described with respect to FIG. 3.

Figure 3A:
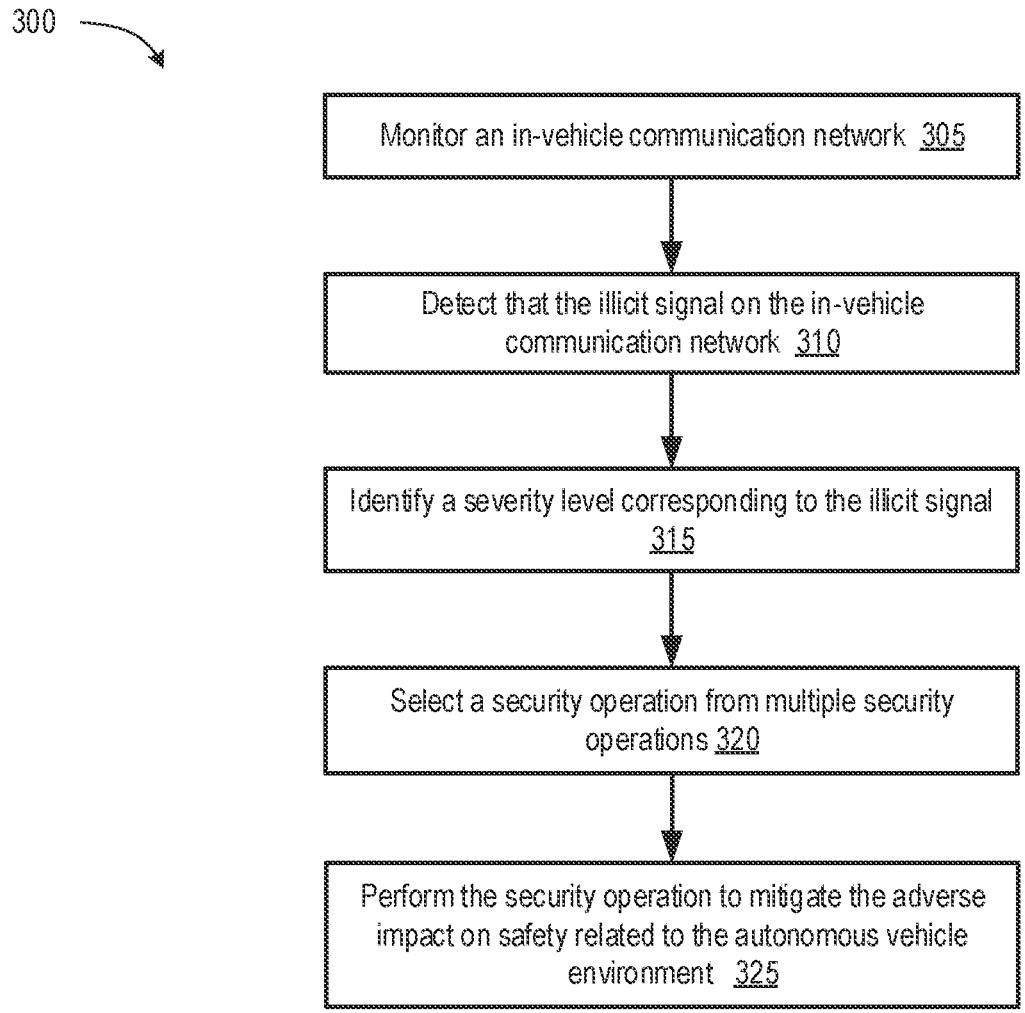
FIG. 3A depicts a flow diagram of an example method of performing a security operation, in accordance with some implementations of the disclosure.

FIG. 3A depicts a flow diagram of an example method 300 of performing a security operation, in accordance with some implementations of the disclosure. Method 300 and/or each of method 300's individual functions, routines, subroutines, or operations can be performed by a processing device, having one or more processing units (CPU) and memory devices communicatively coupled to the CPU(s). In some implementations, method 300 can be performed by a single processing thread or alternatively by two or more processing threads, each thread executing one or more individual functions, routines, subroutines, or operations of the method. The method 300 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, method 300 is performed by security operation module 184 described in FIGS. 1 and 2. Although shown in a particular sequence or order, unless otherwise specified, the order of the operations can be modified. Thus, the illustrated implementations should be understood only as examples, and the illustrated operations can be performed in a different order, while some operations can be performed in parallel. Additionally, one or more operations can be omitted in some implementations. Thus, not all illustrated operations are required in every implementation, and other process flows are possible. In some implementations, the same, different, fewer, or greater operations can be performed. Reference is made to elements of FIG. 1 and FIG. 2 to help illustrate the method 300 of FIG. 3A. As illustrated in FIG. 2, one or more nodes of the in-vehicle communication network can implement a security operation module 184. In some implementations, the method 300 can be performed by each instance of the security operation module 184.

Figure 3B:
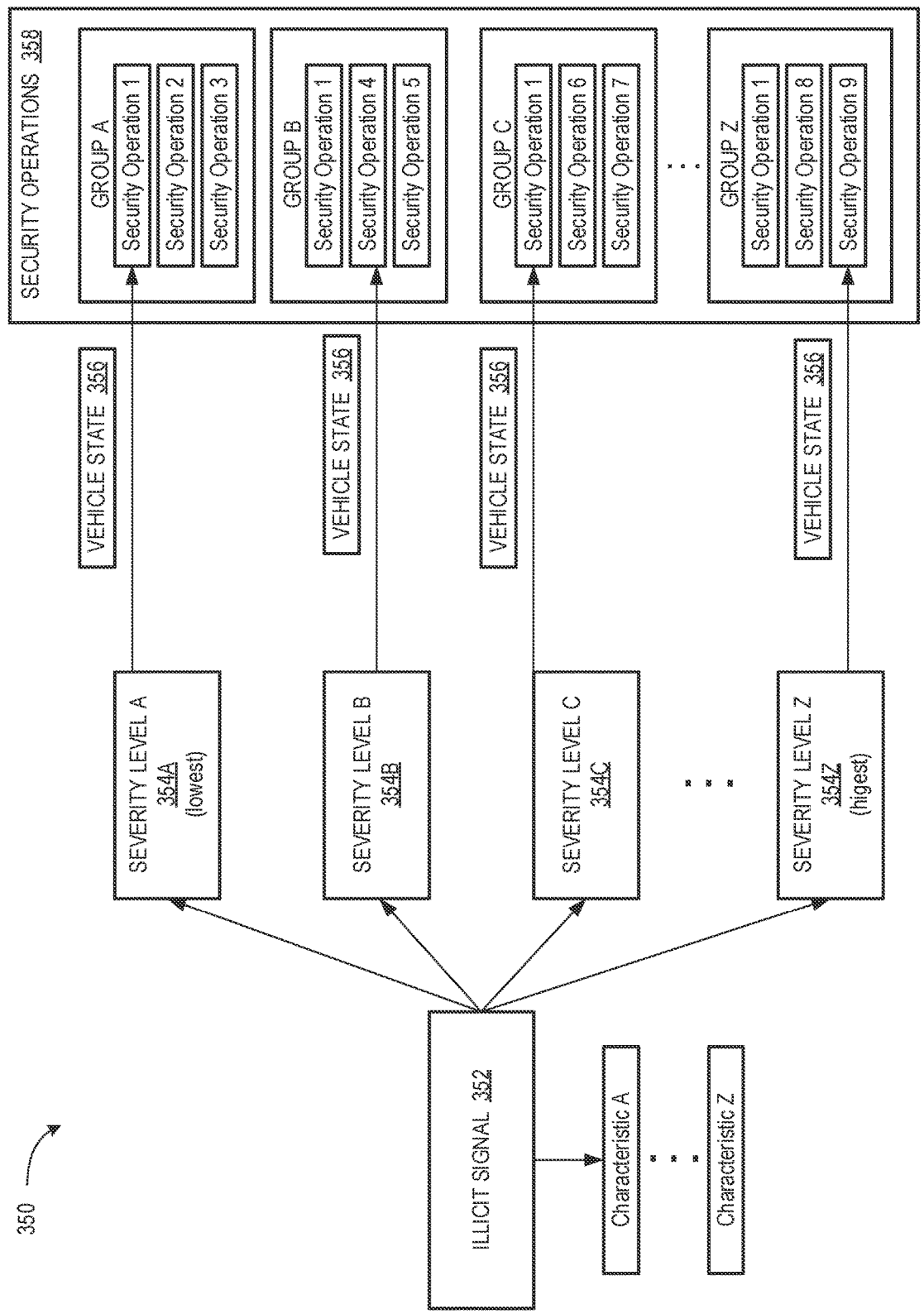
FIG. 3B illustrates a diagram depicting components used in the performance of security operations, in accordance with some implementations of the disclosure.

FIG. 3B illustrates a diagram depicting components used in the performance of security operations, in accordance with some implementations of the disclosure. Diagram 350 of FIG. 3B is used herein to help describe method 300 of FIG. 3A.

Returning to FIG. 3A, at operation 305 of method 300, processing logic monitors the in-vehicle communication network of a vehicle. In some implementations, monitoring the in-vehicle communication network includes receiving a message transmitted at the in-vehicle communication network. In some implementations, monitoring the in-vehicle communication network includes determining one or more message identifiers associated with the message.

As described above, in some implementations, some or all nodes coupled to the bus can listen for and receive all messages transmitted over some or part of the bus (e.g., the part of the bus isolated by a gateway device and on which the particular node is communicatively coupled).

In some implementations, a message (e.g. CAN frame) can include one or more message identifiers (IDs). In some implementations, the message identifiers include a source identifier that identifies the source node (e.g. transmitter) of the message. In some implementations, the message identifiers can include a bus identifier that identifies the bus (e.g., channel) on which the source node resides. In some implementations, the message identifiers can include a content identifier that identifies the content (e.g., payload) of the message. The content of the message can include any type of information including, but not limited to, one or more of action requests (e.g. control commands), action responses, data queries, or data responses. In some implementations, the message identifiers can include a receiver identifier that identifies one or more nodes to which the message is addressed (e.g., CAN acceptance filtering). In some implementations, at least some of the nodes of the in-vehicle communication network can encrypt messages that are transmitted on the in-vehicle communication network.

As noted above, transmitted messages are typically not intended for all nodes even though, in some instances, the messages are broadcast on the in-vehicle communication network. Every node that receives a message may evaluate whether the message is relevant to the local node. In typical operation (e.g., normal mode), to determine whether the received message is relevant, the node may evaluate the receiver ID of the message to determine whether the node is addressed by the message. If the message is relevant to the node (e.g., addressed to the node), then the node may process and act on the message accordingly. If the message is not relevant to the node, then the node may discard the message and the remaining parts of the message are not read (e.g., other message identifiers are not determined).

In monitoring mode, a node can determine one or more message IDs of the message irrespective of whether or not the message is addressed to the particular node (rather than discarding an irrelevant message as performing a typical operation). In some implementations, in monitoring mode the node can determine the contents of each of the received messages (and in particular, one or more of the source ID or content ID) irrespective of whether or not the messages are addressed to the node. In some implementations, in monitoring mode the node can determine the contents of at least some of the messages received irrespective of whether or not the messages are addressed to the node.

In some implementations, monitoring the in-vehicle communication network includes monitoring a vehicle action based on control commands transmitted on the in-vehicle communication network. In some implementations, control commands can be a special type of message that is transmitted by the AVCS. As noted above, control commands can be issued by the AVCS to other systems of the AV (e.g., braking system or steering system) to perform vehicle actions. The AVCS can receive messages on the in-vehicle communication network that continuously report the status of vehicle actions (e.g., monitor).

At operation 310, processing logic detects an illicit signal on the in-vehicle communication network of an autonomous vehicle.

In some implementations, detecting the illicit signal on the in-vehicle communication network includes identifying a source identifier from the one or more message identifiers and determining whether a source node identified by the source identifier transmitted the message on the in-vehicle communication network. Responsive to determining that the source node identified by the source identifier did not transmit the message, processing logic determines the message is an illicit signal (e.g., detects an illicit signal on the in-vehicle communication network). Responsive to making an inconclusive determination as to whether the source node identified by the source identifier transmitted the message, processing logic determines the message is not an illicit signal and returns to operation 305. Responsive to determining that the source node identified by the source identifier did transmit the message, processing logic determines the message is not an illicit signal and returns to operation 305.

It can be noted that in some implementations, a node, e.g., node A, can verify (e.g., only verify) for itself whether node A did or did not transmit a particular message. That is, a message that uses a source ID from node A, when received by another node, e.g., node B, will appear to node B as trustworthy. However, if node A receives a message that uses a source ID that identifies node A as the source, node A can determine that the message is an illicit signal (e.g., that node A did not transmit the message).

In an illustrative example, multiple nodes that share a bus can be vulnerable to attackers who use non-compliant ECUs (or other nodes, such a man-in-the-middle attack nodes) to illicitly transmit signals using misappropriated message identifiers. An attack node can fraudulently pose (e.g., spoof) as a first (legitimate) node by transmitting a message of a type reserved for transmission by the first legitimate node. In some implementations, a message may be explicitly reserved for a particular node through a formal scheme that assigns source identifiers for exclusive use by individual nodes or groups of nodes to the exclusion of other nodes. For example, the first node may correspond to a LIDAR subsystem of an autonomous vehicle, and the source ID '00000100101' may be registered to the LIDAR subsystem so that only the first node is permitted to transmit messages having that source ID. Other nodes that may be coupled to the same bus would not be permitted to transmit a message using this same source ID because the particular source ID has been explicitly reserved for the first node. This ensures that recipient nodes, upon detecting transmission of a message over the bus having source ID '00000100101' can trust that the message originated from the first node (which actually corresponds to the LIDAR subsystem). In other implementations, a source ID may be implicitly reserved for a particular node. Implicit reservation does not rely on a formal registration or assignment mechanism to prevent overlap between source IDs reserved for different nodes. However, in practice, it is ensured that the same source identifier is not doubly reserved for two or more nodes in a manner that could lead to conflict. An attacker (e.g., attack node) transmits a message with the '00000100101' source ID that is reserved for the first node over the bus while the first node is in fact idle (e.g., presenting only recessive signals to the bus, or at minimum presenting no dominant signals to the bus). Since other nodes on the bus expect messages with the '00000100101' source ID to originate only from the first node, the attack node may trick other nodes into acting on the fraudulent message.

In some implementations, a node may have memory that stores a record of source identifiers reserved for the local node (e.g., for the node itself). In some implementations, the record may be permanently stored or may be updateable so that source identifiers may be added, removed, or modified from the reserved record. The node may detect the start of a new message (e.g., new message frame), and then read or obtain bit values from the bus that are indicative of the source ID. The node can compare the bit values to the record of reserved source identifiers for the local node. If a similarity (e.g., match) is not identified between the source identifier read from the bus and any reserved source identifier, then the node may ignore the message as non-illicit and resume monitoring at the start of the next message frame. However, if a similarity (e.g., match) exists between the source identifier appearing on the bus and a reserved source identifier for the local node, the node can determine that the message is an illicit signal.

In some implementations and as noted above, processing logic can monitor the in-vehicle communication network by monitoring a vehicle action that is performed based on control commands transmitted on the in-vehicle communication network. In some implementations, to detect the illicit signal on the in-vehicle communication network, processing logic determines whether the performance of the vehicle action satisfies a threshold tolerance. Responsive to determining that the performance of the vehicle action does not satisfy the threshold tolerance, processing logic determines that an illicit signal is detected. It can be noted that in such a scenario, processing logic may not have direct access to the bus or be able to directly detect the illicit signal. Processing logic can infer a malicious attack by, for example, using a prediction operation or machine learning model, to determine that the performance of the vehicle action is outside the likelihood of a normal failure and is likely a result of an illicit signal (e.g., malicious attack). Responsive to determining that the performance of the vehicle action does satisfy the threshold tolerance, processing logic determines that no illicit signal is detected. In some implementations, the threshold tolerance is the tolerance prescribed by the control command as described above. If the reported status of the vehicle action is outside the tolerance specified by the control command, the vehicle action does not satisfy the threshold tolerance. If the reported status of the vehicle action is within the tolerance specified by the control command, the vehicle action satisfies the threshold tolerance. In some implementations, the threshold tolerance can be different from the tolerance specified by the control command.

At operation 315, processing logic identifies a severity level corresponding to the illicit signal. In some implementations, processing logic identifies, among multiple severity levels, a severity level corresponding to the illicit signal based on one or more characteristics associated with the illicit signal. The severity level is indicative of a level of adverse impact on safety related to an autonomous vehicle environment (e.g., people, the autonomous vehicle, and property near the autonomous vehicle) where the adverse impact is to be caused by the autonomous vehicle when the autonomous vehicle is compromised by the illicit signal.

In some implementations, the severity levels can correspond to (e.g., include, be informed by, or leverage) automotive safety integrity levels (ASILs) that include a classification system defined by the international organization for standardizations (ISO) 26262 standard for the functional safety of road vehicles. For example, there are four ASILs identified by ISO 26262—A, B, C, and D. There is another level called QM (for Quality Management level) that represents hazards that do not dictate any safety requirements. ASIL A represents the lowest degree and ASIL D represents the highest degree of automotive hazard. Systems like airbags, anti-lock brakes, and power steering require an ASIL D grade—the highest rigor applied to safety assurance—because the risks associated with their failure are the highest. On the other end of the safety spectrum, components like rear lights require only an ASIL A grade. Headlights and brake lights generally would be ASIL B while cruise control would generally be ASIL C. With respect to severity levels, in some implementations severity levels (lowest to highest) can correspond, at least in part, to one or more of the ASIL QM, ASIL A, ASIL B, ASIL C, and ASIL D.

In some implementations, the severity level can include an anomalous event severity level (e.g, a single level or graduated severity levels). Particular anomalous events can affect the in-vehicle communication network and be determined to be caused by illicit signals. The anomalous events could appear, on an individual basis, to be events that happen by chance (e.g, anomalous). In some implementations, these events could, at least on an individual basis, appear innocuous and be deemed as a low anomalous event severity level. The security operation for the events that are deemed to be low anomalous event severity levels can be logging the events for further analysis. Over time, the log can be analysed to determine whether the collected events in aggregate occur by chance or are part of a coordinated attack and as a whole constitute an illicit signal that requires a greater anomalous event severity level designation. For example, 10 anomalous events that occur every hundred days could be deemed a low severity level. 100 anomalous events that happen over the course of hours or days could on aggregate constitute an illicit signal and be associated with a higher anomalous event severity level than for the 100 anomalous events taken individually.

In some implementations, the severity level can include a diagnostics severity level (e.g, a single level or graduated severity levels) related to diagnostic communications or events on the in-vehicle communication network. Many diagnostic tools can be used in conjunction with an in-vehicle communication network to, for example, read fault codes or part number codes related to one or more ECUs of the autonomous vehicle. In an example, a tool can read a single part number from an ECU of the autonomous vehicle, which can be a diagnostic event that is not related to an illicit signal. However, if the system detects a large number of part number reads (e.g., greater than a threshold number such as 60,000) over a time period then such diagnostic events can be considered to be related to an illicit signal and be assigned a high diagnostic severity level (e.g., because such a number is indicative of an attacker trying to gain access to the in-vehicle communication network and information available therein). In another example, vehicle state could be another factor in determining whether a diagnostic event is related to an illicit signal and a factor in determining the diagnostic severity level. For example, if a diagnostic event is detected when a brake repair procedure command is issued and the engine is off, the diagnostic event could be determined to be a normal servicing event and not related to an illicit signal. If the brake repair procedure command is issued when the vehicle is travelling at 50 miles per hour, the diagnostic event can be determined to be related to an illicit signal and the diagnostic severity level determined to be high.

Characteristics of illicit signals can refer to information related to the illicit signals. In some implementations, the one or more characteristics of the illicit signal include the contents of the illicit signal such as one or more message IDs, such as the source ID, the content ID, or the receiver ID. In some implementations, the characteristics can also include features or characteristics (also referred to as "derived characteristics" herein) derived from the contents of the illicit signal. Such characteristics (e.g., derived characteristics) can include one or more parts of the in-vehicle network that are impacted by the illicit signal. Part of the in-vehicle communication network can refer to one or more nodes of the in-vehicle communication network, part of the physical bus (e.g., network link) between two or more nodes, communication between two or more nodes using the bus, information stored, written, read, or transmitted on the in-vehicle communication network, or any operation performed on the in-vehicle communication network. For instance, the destination ID can identify the transmission system and the AVCS (e.g., AVCS) can identify that the transmission system has or can be potentially impacted by the illicit signal based at least in part on the destination ID of the illicit signal.

In some implementations, the characteristics of the illicit signal may include one or more parts of the vehicle or in-vehicle communication network that are impacted by the illicit signal (irrespective of whether the impacted parts are determined based on the contents of the illicit signal). For example, the AVCS may determine that a malfunction of the transmission system is outside a normal probability of transmission system malfunctions (such that a malicious attack by an illicit signal can be inferred) and the malfunctioning transmission system is a characteristic of the illicit signal. In another example, the illicit signal can cause vehicle data (e.g., status parameters, version numbers, firmware data, etc.) to be transmitted to a remote device (e.g., malicious remote server). The vehicle data can be a characteristic of the illicit signal.

In some implementations, the characteristics of the illicit signal may correspond to one or more parts of the vehicle or in-vehicle communication network that are impacted by the illicit signal and an encryption status of the illicit signal (e.g., messages). As noted, some systems can implement cryptographic keys in an authentication scheme where some transmitting nodes (e.g., ECUs) encrypt messages sent on the in-vehicle communication network and receiving nodes (e.g., other ECUs) authenticate the messages using the appropriate cryptographic keys. When attack nodes transmit illicit signals (e.g., messages) on the in-vehicle communication network using an authentication scheme, the attack node may or may not have the appropriate cryptographic keys (or no cryptographic keys). As such, the encryption status of an illicit signal can include an incorrect encryption status (no or inappropriate encryption keys) or correct encryption status (e.g., correct encryption keys). It can be noted that if the characteristic of the illicit signal includes an incorrect encryption status the illicit signal can have low impact on the impacted part of the in-vehicle communication network (e.g., because the impacted part does not respond so unencrypted or incorrectly encrypted messages) and a lower severity level than an illicit signal having a characteristic of a correct encryption status that impacts the same impacted part of the in-vehicle communication network.

As illustrated in FIG. 3B, illicit signal 352 is associated with one or more characteristics, as illustrated by characteristic A through characteristic Z. Based on the characteristics associated with illicit signal 352. The illicit signal can be categorized to correspond to one of multiple severity levels, represented by severity level A 254A through severity level Z 254Z (generally referred to as "severity levels 254" herein). In some implementations, the severity levels can be tiered or ranked. For example, severity level A 254A is the lowest severity level, severity level B 254B is the second lowest severity level, and severity level Z 254Z is the highest severity level.

Returning to FIG. 3A, in some implementations, identifying the severity level corresponding to the illicit signal based on the one or more characteristics associated with the illicit signal includes identifying the one or more characteristics associated with the illicit signal and determining that the illicit signal satisfies one or more threshold severity conditions based on the one or more characteristics associated with the illicit signal. The satisfaction of the one or more threshold severity conditions corresponds to the identified severity level. In some implementations, determining that the illicit signal satisfies the one or more threshold severity conditions based on the one or more characteristics associated with the illicit signal includes determining one or more parts of the in-vehicle network that are impacted by the illicit signal based on the one or more characteristics associated with the illicit signal. The one or more impacted parts of the in-vehicle network contribute to the adverse impact to be caused by the autonomous vehicle when the autonomous vehicle is compromised by the illicit signal. In some implementations, determining that the illicit signal satisfies the one or more threshold severity conditions based on the one or more characteristics associated with the illicit signal includes identifying the severity level that corresponds with the one or more impacted parts of the in-vehicle network.

In some implementations, different severity levels can be determined based on the satisfaction of one or more severity conditions. In some implementations, each of the one or more severity conditions can correspond to a severity level. Satisfaction of particular severity conditions can indicate which severity level corresponds to the illicit signal. In some implementations, different security responses (and/or different groups of security responses) can be selected based on the determined severity level corresponding to the illicit signal.

In some implementations, to determine whether the illicit signal satisfies the one or more threshold severity conditions, processing logic can evaluate one or more of the characteristics to determine whether the one or more characteristics satisfy the one or more threshold severity conditions. It can be noted that examples of determining whether illicit signals satisfy the one or more threshold severity conditions are provided herein for purposes of illustration, rather than for limitation. It can be further noted that any characteristic or combination of characteristics can be used to determine whether an illicit signal satisfies the one or more threshold severity conditions.

In an illustrative example, an illicit signal is determined based on a fraudulent source ID. Processing logic can determine whether one or more of the message IDs (e.g., source ID, destination ID, or content ID) of the message is associated with a part of the in-vehicle communication network (e.g., a safety-critical system or safety-critical operation). If processing logic determines that the message is associated with a particular part of the in-vehicle communication network based on one or more of the message IDs, processing logic determines that the illicit signal satisfies one or more of threshold severity conditions. In some implementations, different impacted parts of the in-vehicle communication network can satisfy different respective ones of the one or more threshold severity conditions. For example, an ASIL A system impacted by the illicit signal may satisfy a different threshold severity condition than an ASIL D system impacted by the illicit signal. In another example, if one or more of the message IDs identify a node that operates in a non-critical system (e.g., interior light system or windows) or identifies a non-safety critical operation (e.g., open a window), processing logic may determine that the illicit signal does not satisfy one or more particular threshold severity conditions associated with higher severity levels, but satisfies an alternative severity condition associated with a lower severity level. If one or more of the message IDs identifies a node that operates in a safety-critical system (e.g., steering system, braking system, engine system, exterior lights system, or airbag system) or identifies a safety-critical operation (e.g., steering, braking, engine, or airbag operation), processing logic can determine that the illicit signal satisfies a particular one of threshold severity conditions associated with a higher severity level.

In some implementations, identifying the severity level corresponding to the illicit signal based on the one or more characteristics associated with the illicit signal can be performed using a trained machine learning model. For example, the various characteristics associated with an illicit signal can be used as input to a trained machine learning model. The trained machine learning model can produce output data including the various severity levels and a level of confidence (e.g., probability) that the illicit signal corresponds to each of the severity levels. In some implementations, the output of the trained machine learning model can include the various security operations and a level of confidence for each security operation indicating a likelihood that each security operation is the appropriate security operation to be performed. If the level of confidence exceeds a threshold, the output can be selected.

At operation 320, processing logic selects a security operation from multiple security operations based on the identified severity level.

In some implementations, the multiple security operations include groups of security operations. As illustrated in FIG. 3B, security operations 358 include security operation 1 through security operation 9. The security operations can be ordered in groups illustrated by group A through group Z. Each group includes one or more security operations. In some implementations, at least one of the security operations in a particular group of security operations can be included in another group of security operations. In some implementations, a particular group of security operations correspond to a particular severity level. For example, severity level A 354A corresponds to group A of the security operations 358 and severity level B 354B corresponds to group B of the security operations 358.

Returning to FIG. 3A, in some implementations selecting the security operation from the plurality of security operations based on the identified severity level includes identifying, among the groups of security operations, a first group of security operations corresponding to the identified severity level. Each of the groups of security operations correspond to a respective one of the multiple severity levels. In some implementations, a particular security operation can be selected from the group of security operations corresponding to the security level.

In some implementations, selecting the security operation from the multiple security operations, and in particular from a group of security operations corresponding to a severity level, can be based on or more vehicle states. Vehicle states can include one or more of vehicle redundancy state, vehicle operational state, vehicle contextual state, and vehicle authorization state. In some implementations, characteristics of the illicit signal can include one or more vehicle states. The vehicle states are provided for purposes of illustration rather than limitation. The one or more vehicle states can be used as "modifiers" to help selected from the multiple severity operations, and in particular among a group of security operations corresponding to a severity level, a particular security operation such that the selected security operation is the least intrusive security operation, i.e., has less adverse impact on the safety related to the autonomous vehicle environment when the autonomous vehicle is operating in the current vehicle state than the adverse impact to be caused by the autonomous vehicle when the autonomous vehicle is compromised by the illicit signal and on having a least impact to a current driving mission (or route) of the autonomous vehicle than other ones of the first group of security operations.

In some implementations, a vehicle redundancy state can be indicative of whether a redundant system of the autonomous vehicle is activated. A current redundancy state can include an inactive redundancy state (e.g., none of the redundant systems are active and no redundancy loss), a partial redundancy state (e.g., some or all of the redundant systems are active and the vehicle can continue driving), or full redundancy state (e.g., all the redundant systems have failed).

In some implementations, the vehicle operational state can indicate a motion of the vehicle. For example, the vehicle's operational state can be a parked state or a driving state. In some implementations, the vehicle operational state can be more granular. For example, within the driving state a vehicle can have one or more sub-states such as a coasting state, an accelerating state, a braking state, a turning state, a direction of turning state, a driving forward state, or a driving backwards state, a speed state (e.g., the speed of the vehicle), among others. In another example, within the parked state a vehicle can have one or more sub-states such as an engine on state, an engine off state, a brake engaged state, a brake not engaged state, and so forth.

In some implementations, the vehicle authorization state can indicate the current authorization level of the vehicle. For example, a vehicle authorization state can include a test authorization state used to perform maintenance, diagnostics, or repair on the vehicle. In another example, a vehicle authorization state can include an active authorization state used when the vehicle is enabled for general operation (e.g., normal driving or operation).

In some implementations, vehicle contextual state is indicative of current contextual information with respect to the vehicle. Some examples of the vehicle contextual state include vehicle type, surrounding environment (e.g., other vehicles, pedestrians, bodies of water), road conditions (e.g., ice, snow, water), road type (e.g., dirt, pavement), topography (e.g., incline, decline, etc.), among others.

In some implementations, selecting the security operation from the multiple security operations based on the identified severity level further includes determining a current vehicle state from one or more vehicle states. Processing logic further selects a first security operation from the first group of security operations based on the current vehicle state. In some implementations, the first security operation is selected from the first group of security operations based on having a less adverse impact on the safety related to the autonomous vehicle environment when the autonomous vehicle is operating in the current vehicle state than the adverse impact to be caused by the autonomous vehicle when the autonomous vehicle is compromised by the illicit signal and having a least impact (e.g., for instance logging the illicit signal is has less impact than pulling over to the side of the road) to a current driving mission of the autonomous vehicle than the other ones of the first group of security operations.

Returning to FIG. 3B, the "modifier" vehicle state 356 is illustrated. The security operations 358 in each group are listed in order from least intrusive to most intrusive. For instance, of group A of security operations, security operation 1 is the least intrusive security operation and security operation 3 is the most intrusive security operation. In an illustrative example, an illicit signal 352 is identified and determined to correspond to severity level Z 354Z, which is the highest severity level. For instance, the illicit signal is impacting the braking system of the vehicle. Severity level Z 354Z is associated with group Z of the security operations 358. The security operations of group Z are ranked from least intrusive to most intrusive. The vehicle's operational state is a parked state, rather than the driving state. As such, a less intrusive security operation can be selected (e.g., security operation 8). In another instance, if the vehicle authorization state is a test authorization state used to perform maintenance or diagnostics the selected security operation may even be less intrusive (e.g., security operation 1). In contrast, if the vehicle operational state were a driving state and the authorization state were an active authorization state for normal driving, the selected security operation may be the most intrusive (e.g., security operation 9).

At operation 325, processing logic performs the one or more security operations to mitigate the adverse impact on safety related to the autonomous vehicle environment.

In some implementations, security operations include, but are not limited to, a data logging operation, a customer support operation, an engagement prevention operation, a complete current ride operation, a transmission shift operation, a parking operation, a pull over operation, a braking operation, and a denial of service operation.

In some implementations, a data logging operation stores data related to the illicit signal. In some implementations, the data related to the illicit signal is sent to a remote server, such as AV server 150 of FIG. 1. In some implementations, the remote server can make a determination on the illicit signal and send a response to AV 101 directing the AV to perform a particular security operation (if any) or to continue logging data.

In some implementations, a customer support operation can include contacting a customer support service via a network such as a cellar network. The customer support service can offer services such as roadside assistance, towing, or technical support, for instance. In some implementations, an engagement prevention operation can prevent the vehicle from starting and driving. In some implementations, a complete current ride operation allows the vehicle to complete the current ride (e.g., complete the drive to the destination address). In some implementations, the complete ride operation may not allow any further missions (e.g., driving) once the current ride is completed. In some implementations, a transmission shift operation can shift the transmission to a different gear, such as to park or neutral. In some implementations, a parking operation can direct the vehicle to park in the nearest available parking lot (e.g., next freeway exit parking lot). In some implementations, a pull over operation can direct the vehicle to pull over to the side of the road. In some implementations, a braking operation directs the vehicle to immediately engage the brakes of the vehicle.

In some implementations, a denial of service operation can include an operation that disables communication on at least part of the in-vehicle communication network impacted by the illicit signal. In some implementations, a denial of service operation can include a node-based denial of service operation where one or more nodes are disabled (e.g., the voltage supply to the one or more nodes is changed to 0 volts). In some implementations, a denial of service operation can include a network-based denial of service operation where communication between two or more nodes is disabled (e.g., at least part of the network bus is pulled to fixed voltage potential, such as 0V or 5V, prohibiting messages to be communicated on at least part of the bus). Reference to a denial of service operation can refer to one or more of a node-based denial of service operation or a network-based denial of service operation, unless otherwise described. In some implementations, the denial of service operation can disable a part of the in-vehicle communication network such that some of the functionality of the in-vehicle communication network (and hence functionality of the respective vehicle system(s)) is reduced. The denial of service operation can target the specific part(s) of the in-vehicle communication network that are impacted by the illicit signal such that other parts of the in-vehicle communication network remain functional.

In some implementations, the powertrain system can be disabled (causing a loss of propulsion)1. In an exemplary illustration, the denial of service operation can cause a moving vehicle to coast and pull to the side of the road after which the engine is shut off and the vehicle is prevented from restarting.

In some implementations, the denial of service operation includes at least reducing power (e.g. power reduction operation) to at least part of the in-vehicle communication network to prevent communication on at least part of the in-vehicle communication network affected by the illicit signal. In some implementations, a power reduction operation can include at least a partial reduction in power, and in some cases, a full reduction of power at one or more nodes (or a component thereof) of the in-vehicle communication network. In an illustrative example, the power to a particular DCU that detects or is affected by the illicit signal can have its power supply turned off or power to the main processing device of the particular DCU can be turned off. In another example, AVCS 240A of FIG. 2 can control the power (e.g., voltage) supplied to ECU 202A using voltage control device. In some implementations, the power reduction operation can be performed by disconnecting a power supply from one or more nodes using a switch or other type of physical or electrical disconnection. In some implementations, the denial of service operation can include an action that decouples the bus from respective nodes on at least part of the in-vehicle communication network. In some examples, AVCS 240A can disable the transmission of messages on bus 260A by pulling the voltage of at least part of the bus (e.g., bus 260A) to a fixed voltage potential (e.g., a ground potential or 5 Volts) such voltage/signal differentiation on the bus cannot be performed.

In some implementations, performing a denial of service operation includes a flooding operation that floods at least part of the in-vehicle communication network with signals that prevent additional illicit signals from being communicated between nodes in at least part of the in-vehicle communication network. The flooding operation can be a countermeasure, as described herein. For example, in some implementations, processing logic generates signals to flood at least part of the in-vehicle communication network. Processing logic transmits the signals on at least part of the in-vehicle communication network affected by the illicit signal to flood at least the part of the in-vehicle communication network. The flood of signals prevents the communication of additional illicit signals between nodes in at least the part of the in-vehicle communication network. In some implementations, the flood operation disables the vehicle.

In some implementations, in-vehicle communication network comprises a redundant system including a first vehicle sub-system (e.g., system or subsystem) and a second vehicle sub-system (e.g., system or subsystem) configured to perform redundant vehicle operations using the in-vehicle communication network. The denial of service operation disables at least part of the first vehicle sub-system that is affected by the illicit signal and enables at least part of the second vehicle sub-system to perform the redundant vehicle operations that were previously performed by the first vehicle sub-system. It can be noted that in some implementations, disabling a part of the in-vehicle communication network can disable at least part of the first vehicle sub-system that is affected by the illicit signal. In some implementations, disabling a part of the first vehicle sub-system causes the respective redundant sub-system (e.g., second vehicle sub-system) to be enabled and to perform the functionality previously performed by the first vehicle sub-system.

Figure 4:
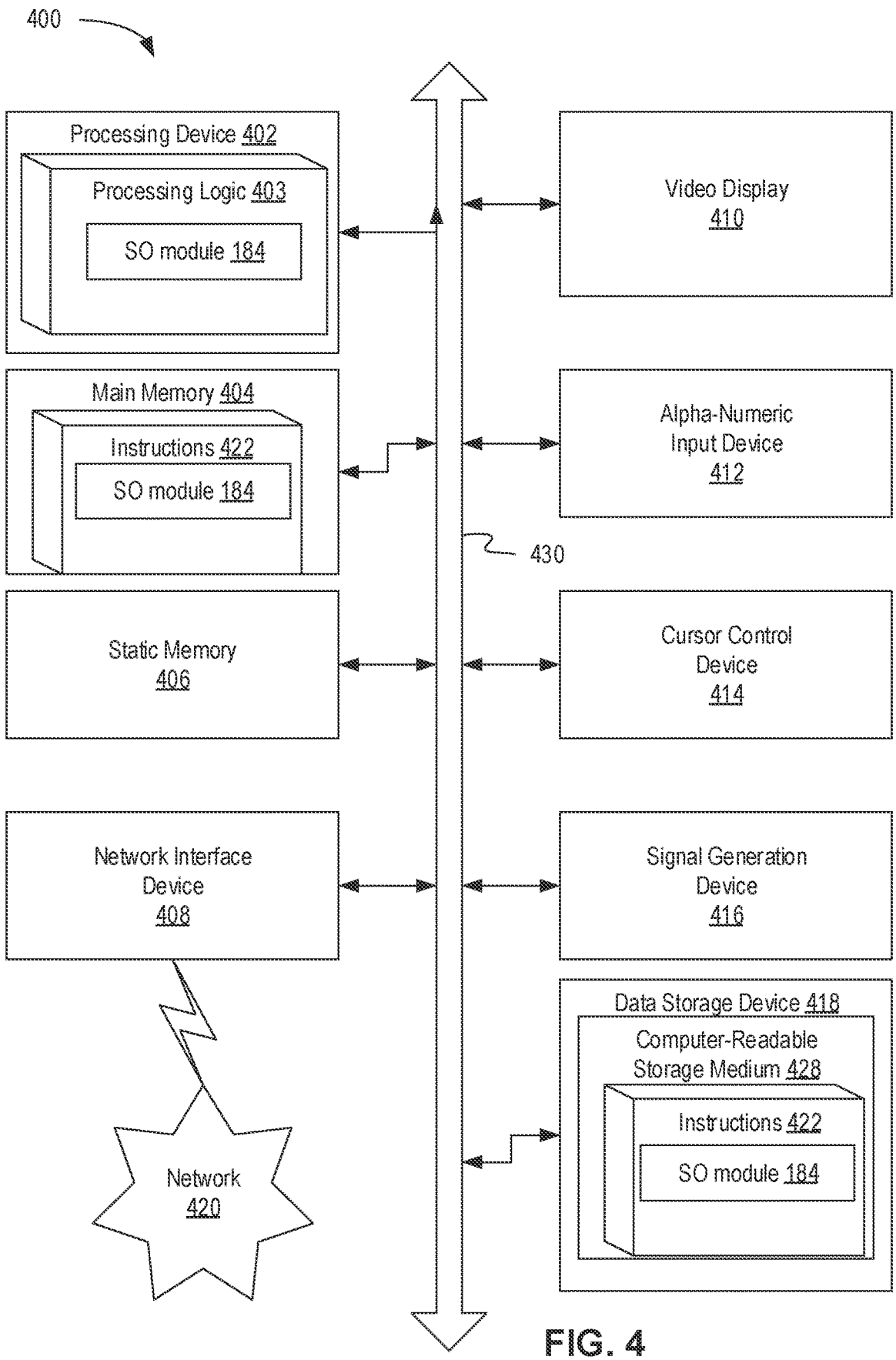
FIG. 4 depicts a block diagram of an example computer device within which a set of instructions, for causing the machine to perform any of the one or more methodologies discussed herein can be executed, in accordance with some implementations of the disclosure.

FIG. 4 depicts a block diagram of an example computer device 400 within which a set of instructions, for causing the machine to perform any of the one or more methodologies discussed herein can be executed, in accordance with some implementations of the disclosure. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor or CPU), which can include processing logic 403, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a secondary memory (e.g., a data storage device 418), which can communicate with each other via a bus 430.

Processing device 402 represents one or more general-purpose processing devices such as a microprocessor, central processing unit, or the like. More particularly, processing device 402 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 402 can be configured to execute instructions performing any of the operations performed by security operation module 184.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 416 (e.g., a speaker).

Data storage device 418 can include a computer-readable storage medium (or, more specifically, a non-transitory computer-readable storage medium) 428 on which is stored one or more sets of executable instructions 422. In accordance with one or more aspects of the disclosure, executable instructions 422 can comprise executable instructions to perform any of the operations of security operation module 184.

Executable instructions 422 can also reside, completely or at least partially, within main memory 404 and/or within processing device 402 during execution thereof by example computer device 400, main memory 404 and processing device 402 also constituting computer-readable storage media. Executable instructions 422 can further be transmitted or received over a network via network interface device 408.

While the computer-readable storage medium 428 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored instructions thereon, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
   detecting an illicit signal on an in-vehicle communication network of an autonomous vehicle;
   identifying, among a plurality of severity levels and at the autonomous vehicle, a severity level corresponding to the illicit signal based on one or more characteristics associated with the illicit signal, the severity level indicative of a level of potential adverse impact on safety related to an autonomous vehicle environment, the potential adverse impact to be caused by the autonomous vehicle when the autonomous vehicle is compromised by the illicit signal;
   identifying, among a plurality of groups of security operations, a first group of security operations corresponding to the identified severity level;
   selecting, at the autonomous vehicle, a security operation from the first group of security operations based on a current vehicle state of the autonomous vehicle; and
   performing, by a processing device, the security operation to mitigate the potential adverse impact on safety related to the autonomous vehicle environment.

2. The method of claim 1, wherein selecting the security operation from the first group of security operations further comprises:
   determining the current vehicle state from a plurality of vehicle states.

3. The method of claim 2, wherein the security operation is selected from the first group of security operations based on having a less potential adverse impact on the safety related to the autonomous vehicle environment when the autonomous vehicle is operating in the current vehicle state than the potential adverse impact to be caused by the autonomous vehicle when the autonomous vehicle is compromised by the illicit signal and on having a least impact to a current driving mission of the autonomous vehicle than the other ones of the first group of security operations.

4. The method of claim 2, wherein the plurality of vehicle states comprise a vehicle redundancy state indicative of whether a redundant system of the autonomous vehicle is activated.

5. The method of claim 2, wherein the plurality of vehicle states comprise a vehicle operational state indicative of a motion of the autonomous vehicle.

6. The method of claim 1, wherein identifying the severity level corresponding to the illicit signal based on the one or more characteristics associated with the illicit signal comprises:
identifying the one or more characteristics associated with the illicit signal; and
determining that the illicit signal satisfies one or more threshold severity conditions based on the one or more characteristics associated with the illicit signal, wherein the satisfaction of the one or more threshold severity conditions corresponds to the identified severity level.

7. The method of claim 6, wherein determining that the illicit signal satisfies the one or more threshold severity conditions based on the one or more characteristics associated with the illicit signal comprises:
determining one or more parts of the in-vehicle communication network that are impacted by the illicit signal based on the one or more characteristics associated with the illicit signal, wherein the one or more impacted parts of the in-vehicle communication network contribute to the potential adverse impact to be caused by the autonomous vehicle when the autonomous vehicle is compromised by the illicit signal; and
identifying the severity level that corresponds with the one or impacted parts of the in-vehicle communication network.

8. The method of claim 1, further comprising:
monitoring the in-vehicle communication network of the autonomous vehicle.

9. The method of claim 8, wherein monitoring the in-vehicle communication network of the autonomous vehicle comprises:
receiving a message transmitted at the in-vehicle communication network;
determining one or more message identifiers associated with the message; and
wherein detecting the illicit signal on the in-vehicle communication network of the autonomous vehicle comprises:
identifying a source identifier of the one or more message identifiers; and
determining whether a source node identified by the source identifier transmitted the message on the in-vehicle communication network, wherein the illicit signal is detected by determining that the source node identified by the source identifier did not transmit the message.

10. A system, comprising:
a memory; and
a processing device, coupled to the memory, to:
detect an illicit signal on an in-vehicle communication network of an autonomous vehicle;
identify, among a plurality of severity levels and at the autonomous vehicle, a severity level corresponding to the illicit signal based on one or more characteristics associated with the illicit signal, the severity level indicative of a level of potential adverse impact on safety related to an autonomous vehicle environment, the potential adverse impact to be caused by the autonomous vehicle when the autonomous vehicle is compromised by the illicit signal;
identify, among a plurality of groups of security operations, a first group of security operations corresponding to the identified severity level;
select, at the autonomous vehicle, a security operation from the first group of security operations based on a current vehicle state of the autonomous vehicle; and
perform the security operation to mitigate the potential adverse impact on safety related to the autonomous vehicle environment.

11. The system of claim 10, wherein to identify the severity level corresponding to the illicit signal based on the one or more characteristics associated with the illicit signal, the processing device to:
identify the one or more characteristics associated with the illicit signal; and
determine that the illicit signal satisfies one or more threshold severity conditions based on the one or more characteristics associated with the illicit signal, wherein the satisfaction of the one or more threshold severity conditions corresponds to the identified severity level.

12. The system of claim 11, wherein to determine that the illicit signal satisfies the one or more threshold severity conditions based on the one or more characteristics associated with the illicit signal, the processing device to:
determine one or more parts of the in-vehicle communication network that are impacted by the illicit signal based on the one or more characteristics associated with the illicit signal, wherein the one or more impacted parts of the in-vehicle communication network contribute to the potential adverse impact to be caused by the autonomous vehicle when the autonomous vehicle is compromised by the illicit signal; and
identify the severity level that corresponds with the one or impacted parts of the in-vehicle communication network.

13. A non-transitory computer-readable medium comprising instructions that, responsive to execution by a processing device, cause the processing device to perform operations, comprising:
detecting an illicit signal on an in-vehicle communication network of an autonomous vehicle;
identifying, among a plurality of severity levels and at the autonomous vehicle, a severity level corresponding to the illicit signal based on one or more characteristics associated with the illicit signal, the severity level indicative of a level of potential adverse impact on safety related to an autonomous vehicle environment, the potential adverse impact to be caused by the autonomous vehicle when the autonomous vehicle is compromised by the illicit signal;
identifying, among a plurality of groups of security operations, a first group of security operations corresponding to the identified severity level;
selecting, at the autonomous vehicle, a security operation from the first group of security operations based on a current vehicle state of the autonomous vehicle; and
performing, by the processing device, the security operation to mitigate the potential adverse impact on safety related to the autonomous vehicle environment.

14. The non-transitory computer-readable medium of claim 13, wherein selecting the security operation from the first group of security operations, the operations comprising:
determining the current vehicle state from a plurality of vehicle states.

15. The non-transitory computer-readable medium of claim 14, wherein the security operation is selected from the first group of security operations based on having a less potential adverse impact on the safety related to the autonomous vehicle environment when the autonomous vehicle is operating in the current vehicle state than the potential adverse impact to be caused by the autonomous vehicle when the autonomous vehicle is compromised by the illicit signal and on having a least impact to a current driving mission of the autonomous vehicle than the other ones of the first group of security operations.

16. The non-transitory computer-readable medium of claim 14, wherein the plurality of vehicle states comprise a vehicle redundancy state indicative of whether a redundant system of the autonomous vehicle is activated.

17. The non-transitory computer-readable medium of claim 14, wherein the plurality of vehicle states comprise a vehicle operational state indicative of a motion of the autonomous vehicle.

* * * * *